Figure 1:
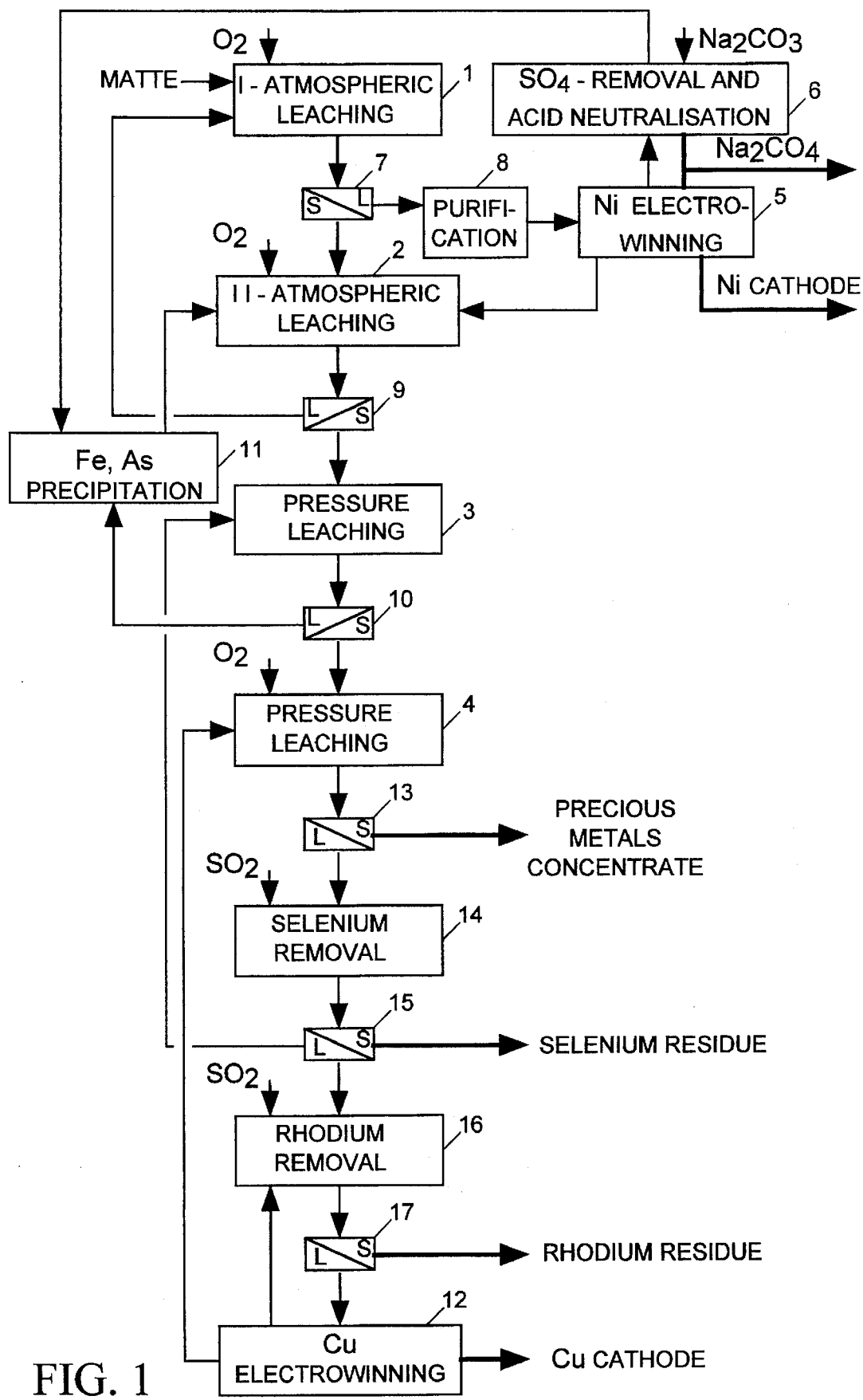

United States Patent [19]
Fugleberg et al.

[11] Patent Number: 5,628,817
[45] Date of Patent: May 13, 1997

[54] METHOD FOR LEACHING NICKEL-COPPER MATTE EMPLOYING SUBSTANTIALLY NEUTRAL LEACHING SOLUTIONS

[75] Inventors: Sigmund Fugleberg, Turku; Stig-Erik Hultholm, Pori, both of Finland; Terry Holohan, Harare, Zimbabwe

[73] Assignee: Outokumpu Engineering Contractors OY, Espoo, Finland

[21] Appl. No.: 554,972

[22] Filed: Nov. 13, 1995

[30] Foreign Application Priority Data

Nov. 15, 1994 [FI] Finland .................................. 945379

[51] Int. Cl.$^6$ .................................................. C22B 3/06
[52] U.S. Cl. ........................... 75/743; 423/27; 423/150.4
[58] Field of Search ................................. 75/743; 423/22, 423/27, 34, 150.3, 150.4

[56] References Cited

U.S. PATENT DOCUMENTS

| | | | |
|---|---|---|---|
| 3,218,161 | 11/1965 | Kunda et al. | 75/108 |
| 4,093,526 | 6/1978 | Blanco et al. | 204/104 |
| 4,571,262 | 2/1986 | Kerfoot et al. | 75/101 |
| 5,344,479 | 9/1994 | Kerfoot et al. | 75/743 |

*Primary Examiner*—David A. Simmons
*Assistant Examiner*—Jerry Allen Lorengo
*Attorney, Agent, or Firm*—Smith-Hill and Bedell

[57] ABSTRACT

The invention relates to a process for leaching nickel and copper from nickel-copper matte formed in pyrometallurgical nickel production by means of a multi-stage process. It is essential of the invention that the leaching of nickel takes place in at least two stages in conditions where free sulfuric acid is essentially absent, and that in these stages, the leaching of the nickel content of the matte is mainly carried out with copper as the oxidizer.

17 Claims, 1 Drawing Sheet

METHOD FOR LEACHING NICKEL-COPPER MATTE EMPLOYING SUBSTANTIALLY NEUTRAL LEACHING SOLUTIONS

The present invention relates to a method for leaching nickel and copper from a pyrometallurgically produced nickel-copper matte created in pyrometallurgical nickel production by employing a multi-stage process. It is essential to the invention that the leaching of nickel takes place in at least two stages in conditions essentially without free sulfuric acid, and that the leaching of the nickel content of the matte takes place mainly with copper as an oxidising agent.

In the prior art there is known a process described in the U.S. Pat. No. 3,741,752, where the leaching of nickel-copper matte is carried out as a three-stage pressure leaching process. Ground matte is leached in the first, oxidizing pressure leaching stage by means of an anolyte recycled from copper electrowinning. The purpose is to make the main portion of the nickel dissolve, but leave the copper undissolved. If necessary, the final part of this first leaching stage can be carried out under non-oxidizing conditions. After separating the solution and the precipitate, the solution is conducted to purification stages, whereafter there follows the nickel electrowinning. The leaching of the precipitate is continued in the second, oxidizing pressure leaching stage, again with a copper anolyte, and now it is attempted to leach the whole copper and nickel content of the precipitate. The solution obtained from this leaching is conducted after purification into copper electrowinning. If the precious metal content of the starting material is high, it is possible, when necessary, to subject the precipitate coming from the second stage to a third pressure leaching stage carried out under particularly oxidizing conditions, so that a minimal amount of copper and nickel is left in the precious metal residue.

In the prior art there is also known the process described in the U.S. Pat. No. 4,093,526 for recovering valuable materials from nickel-copper matte. In this process the first leaching stage is carried out in atmospheric conditions with a solution recycled from the second leaching stage; if necessary, sulfuric acid is fed into this stage. The purpose of the first leaching stage is to leach nickel from the matte as nickel sulfate and to recover into the precipitate either metallic copper or copper hydroxide, which are dissolved in the conditions of the second leaching stage. The solution obtained from the first stage is conducted to purification and thereafter into nickel electrowinning. The precipitate from atmospheric leaching is leached further, and the second leaching stage is carried out as pressure leaching under oxidizing conditions, and anolyte recycled from copper electrowinning plus sulfuric acid are fed in the process. The copper cemented in the first stage is dissolved in these leaching conditions and leaches the nickel remaining in the precipitate, and when this solution from the second stage is conducted back into the first stage, it reacts with the nickel sulfide $Ni_3S_2$ and with elemental nickel contained in the matte, leaching both. As a result from these reactions, copper is precipitated as acid-soluble copper, as was maintained above. The precipitate from the second stage is leached with the anolyte from copper electrowinning under oxidizing conditions in an autoclave, as a so-called total leaching, the purpose of which is to leach all of the nickel, cobalt and copper left in the precipitate. The solution coming from the third stage is conducted, after purification, into copper electrowinning, and the formed precipitate is mainly iron precipitate, which can be discarded.

The U.S. Pat. No. 4,323,541 introduces a leaching process for nickel-copper matte, comprising first a two-stage oxidizing atmospheric leaching stage and thereafter a pressure leaching stage, the purpose of which is to leach the nickel contained in the matte but to leave the main portion of the copper unleached. Thus the precipitate formed in the third leaching stage contains the major portion of the copper and precious metals, and can be conducted to further processing for instance in a copper refinery.

Another leaching process for nickel-copper matte is described in the GB patent publication 2,108,480. In the first stage, the matte is leached in pressure leaching under oxidizing conditions with an anolyte recycled from copper electrowinning. When at least 70% of the nickel content of the matte is leached, the leaching is continued in non-oxidizing conditions. The solution obtained from the first stage is processed further by subjecting it to oxidizing atmospheric purification leaching, whereto finely ground matte also is fed. The purpose of the purification leaching is to remove the dissolved copper and iron from the solution. The solution obtained from the purification leaching is conducted, via purification, to nickel electrowinning and then back to the first-stage leaching. The leach precipitate from the first stage is conducted to a second pressure leaching stage, which also is carried out in oxidizing conditions with an anolyte recycled from copper electrowinning. The purpose of the second stage is to carry out a total leaching of the copper, and the solution obtained from this leaching is conducted to copper electrowinning after possible selenium removal. The formed precipitate contains the main portion of the iron that was present in the matte.

Yet another method for recovering nickel from nickel-copper matte is described in the CA patent application 2,063,031. In this method, the first stage comprises an atmospheric, oxidizing and acidic leaching of the matte into an anolyte recycled from nickel electrowinning, the said anolyte containing roughly 50 g/l Ni and 50 g/l $H_2SO_4$. From the leaching there is obtained a nickel sulfate solution, which after purification is conducted to nickel electrowinning. The formed precipitate contains cemented metallic copper, copper sulfide, copper oxide and non-reacted nickel sulfide and nickel oxide. During the leaching, the pH is maintained within the range of 4.0–6.5.

The second-stage leaching takes place in similar conditions as the first, i.e. the leaching is carried out to a nickel anolyte, and the purpose is to leach the bulk of the remaining nickel and form a precipitate where about 60% is in acid-soluble form, for instance as basic sulfates of copper and nickel, and as ferric arsenate. The solution from the second leaching stage is conducted to the first stage, and the result is a copper-rich precipitate, which is conducted to non-oxidizing pressure leaching taking place in acidic conditions. Even to this stage, there is fed anolyte from nickel electrowinning. The purpose of the pressure leaching stage is to leach nickel and ferric arsenate selectively from the precipitate, so that copper remains unleached. The formed solution is partly conducted to the second leaching stage, and the rest is subjected to iron and arsenic precipitation. The resulting precipitate contains the copper and the precious metals and is advantageously transferred to a copper refinery. The process is of the same type as that described in the above mentioned U.S. Pat. No. 4,323,541, except that the last leaching taking place in an autoclave is not carried out under 'oxidizing' conditions but under 'non-oxidizing' conditions; this being in the absence of gaseous oxygen.

In the process of the present invention, the leaching of nickel-copper matte also takes place in several stages, the first of which are carried out in atmospheric conditions and the successive as pressure leaching. It is typical of the process of the present invention that the leaching of the nickel content of the nickel-copper matte is performed essentially by making use of the oxidizing effect of the copper ion. Thus, in the first leaching stage of the process of the present invention, instead of acidic conditions there are created conditions where matte is leached into a neutral nickel sulfate solution containing copper sulfate, so that the copper sulfate contained in the solution leaches the nickel contained in the matte. In connection with the leaching, there are created several acid-soluble copper compounds, such as basic copper sulfates and copper hydroxide, which are, however, precipitated in this neutral leaching stage.

The conditions in the second leaching stage are acidic, and the created copper compounds react with sulfuric acid into copper sulfate, which again further leaches the nickel content of the matte. The third leaching stage is pressure leaching, where the precipitate coming from the second stage is leached into neutral copper sulfate solution in mildly oxidizing or non-oxidizing conditions, and the result is a total leaching of nickel, while the main portion of the copper is precipitated. In order to leach the copper content of the precipitate obtained from the total leaching of nickel, there is carried out a leaching in oxidizing and acidic conditions, as a result of which the copper content of the matte is leached and conducted to copper electrowinning. The remaining precipitate contains the precious metals and can thus be treated according to known methods. When necessary, copper sulfate solution is subjected to selenium and rhodium removal according to known processes prior to copper electrowinning. With the present method it is possible to achieve a good recovery of valuable metals. With valuable metals we mean at least nickel, copper, cobalt, lead and precious metals, where we include silver, gold, platinum, palladium, selenium and rhodium.

Another essential feature in the process of the present invention is that at least one atmospheric and one pressure leaching stage are carried out in neutral conditions, and that even in the other stages, the tendency is to use as neutral solutions as possible. Here neutral conditions mean such conditions where free acids are essentially absent. An advantage of the neutral stages is that the conditions are less corroding than in such methods where all leaching stages are carried out in acidic conditions, for example with the return acid (anolyte) from nickel or copper electrowinning. Another advantage worth pointing out is that we have found out that more neutral conditions tend to enhance the formation of such intermediate products which in the next process stage are rapidly soluble. The essential novel features of the invention are apparent from the appended patent claims.

The invention is further described with reference to the accompanying drawing in which FIG. 1 illustrates a process flowchart.

The nickel content in nickel-copper matte fed into the first atmospheric leaching stage 1 is present in several different forms, such as elemental nickel $Ni^0$ or as nickel sulfide $Ni_3S_2$, which at this stage could be called primary sulfide, because it is a product of a pyrometallurgical operation. Excessive sulfate is removed from the anolyte obtained from nickel electrowinning 5 by means of sodium carbonate, and the created nickel carbonate is used in neutralizing the free sulfuric acid in the stage 6. Nickel carbonate can also be used later, for neutralizing iron and arsenic precipitates. The sodium sulfate created in the sulfate removal is led away from the circuit. An essentially neutral $NiSO_4$ solution is conducted to the first atmospheric leaching stage 1. In addition to this, into the first leaching stage there is fed the copper sulfate bearing nickel sulfate solution recycled from a solid/liquid separation stage 9 following the next atmospheric leaching stage 2, as well as oxygen or air. Owing to the effect of copper sulfate and oxygen, elemental nickel and nickel sulfide are oxidized into nickel sulfate. The process also produces basic copper sulfate $CuSO_4*2Cu(OH)_2$, antlerite, as well as a small amount of cuprite $Cu_2O$ and ferric arsenate which all go into the precipitate in this stage. Therefore the stage can also be called copper removal stage. The leaching is carried out in atmospheric conditions, in the temperature range of 80°–100° C. After leaching, liquid and precipitate are separated in stage 7 by means of normal separation methods. The nickel sulfate solution created in the leaching is conducted, after cobalt removal 8, to nickel electrowinning 5.

The precipitate created in the first atmospheric leaching stage 1 is conducted to the second atmospheric leaching stage 2, whereto anolyte from nickel electrowinning 5 also is fed. It is essential for the whole process that the return acid (anolyte) from the nickel electrowinning is fed only to this stage. Owing to the influence of the free sulfuric acid contained in the anolyte (about 50 g/l $H_2SO_4$), the primary nickel sulfide $Ni_3S_2$ contained in the nickel-copper matte is partially leached and forms one mole of nickel sulfate and two moles of secondary nickel sulfide NiS per one mole of $Ni_3S_2$. The reaction is as follows:

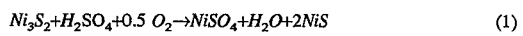

$$Ni_3S_2 + H_2SO_4 + 0.5\ O_2 \rightarrow NiSO_4 + H_2O + 2NiS \quad (1)$$

It is not, however, desired that the created nickel sulfide NiS should further react with sulfuric acid resulting in the formation of another sulfide, $Ni_3S_4$, because this decomposes very slowly in the successive leaching stages. The undesirable reaction is:

$$4NiS + H_2SO_4 + 0.5\ O_2 \rightarrow Ni_3S_4 + NiSO_4 + H_2O \quad (2)$$

In the second leaching stage, primary copper sulfide, chalcocite $Cu_2S$ also partially leaches when reacting with sulfuric acid and forms secondary copper sulfide, covellite CuS, and copper sulfate. In addition to this, basic copper sulfate also dissolves in these conditions and forms more copper sulfate in the solution. Acid is needed in the leaching reactions in this stage, too. The solution created in the second stage is recycled to the leaching of the first stage, and as was maintained above, it contains copper sulfate required in the leaching. After the leaching of the second stage, it can be said that the elemental nickel and nickel sulfide $Ni_3S_2$ contained in the matte is virtually leached, and of the nickel compounds, the created precipitate consists of essentially secondary nickel sulfide NiS created in the reactions of this stage. In addition, the precipitate naturally contains the non-soluble copper compounds, precious metals and some compounds of iron and arsenic. The solution and precipitate are again separated in the separation stage 9.

The precipitate from the second atmospheric leaching is conducted into the third leaching stage 3, pressure leaching, where the precipitate is leached with a copper sulfate solution recycled from a later process stage (pressure leaching of copper). The temperature in the third leaching stage is at least 110° C. A mildly oxidizing atmosphere is maintained in the autoclave, and oxygen or air is fed therein, although the main reactions as such do not necessarily require the feeding of oxygen. A mildly oxidizing atmosphere is advantageous as the remaining primary nickel sulfide is leached according to the following reaction:

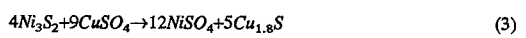

$$4Ni_3S_2 + 9CuSO_4 \rightarrow 12NiSO_4 + 5Cu_{1.8}S \quad (3)$$

The secondary nickel sulfide NiS created in the second atmospheric leaching is dissolved in the reactions between the NiS itself, copper sulfate and water, so that after this leaching stage, all of the nickel can be said to have dissolved. The following can be considered as the main reaction:

$$6NiS + 9CuSO_4 + 4H_2O \rightarrow 6NiSO_4 + 5Cu_{1.8}S + H_2SO_4 \quad (4)$$

Thus the reactions in this stage do not require free acid in the solution. In the nickel leaching process, copper is precipitated as digenite $Cu_{1.8}S$, in addition to which sulfuric acid is created in the reactions. Covellite CuS also reacts partly with copper sulfate forming more digenite and sulfuric acid. The iron and arsenic precipitated from the matte are partly dissolved in this stage, because it can be said that they dissolve as a function of the amount of acid. The solution obtained from this leaching stage is conducted, via the precipitate separation stage 10, to iron removal 11 and thereafter to the second atmospheric leaching 2. The iron removal is carried out according to some known method, for instance by using nickel carbonate as the neutralizing agent and oxidising the iron to ferric hydroxide using oxygen.

This third pressure leach is extended in order to precipitate any soluble selenium or precious metals emanating from the fourth stage leach 4 returned via the copper sulfate solution. The solution leaving the third pressure leaching stage 3 will essentially be free of soluble selenium and precious metals.

The mainly digenite bearing precipitate from the nickel pressure leaching stage is conducted to the next stage, i.e. copper pressure leaching stage 4, which also can be called total leaching, because there all of the copper as well as the last remains of nickel and cobalt possibly left in the precipitate are leached with anolyte recycled from copper electrowinning 12 located further in the process. Moreover, oxygen or air is fed into the leaching stage. The temperature in the leaching is 80°–150° C., preferably 110°–130° C. The leaching succeeds in a very acidic environment as well, but it is advantageous to carry out in conditions where antlerite is precipitated, i.e. where the pH is 2.7–3.2, preferably about 3. The precipitated antlerite is leached shortly before the liquid-solid separation with a small addition of anolyte or acid. The residue obtained from the leaching mainly contains the precious metals, and this residue is advantageously conducted to precious metal refining.

The solution obtained from copper pressure leaching is after separation 13 conducted to selenium removal 14, which is carried out for instance by means of sulfur dioxide, and selenium is precipitated as copper selenide. The solution obtained in the separation stage 15 is fairly pure neutral copper sulfate, which is advantageously conducted to nickel leaching 3; this means that into this stage there is obtained a solution essentially without free acid. It is not, however, necessary to recycle all of this solution to nickel leaching, but part of it can be conducted, via rhodium removal 16 and successive solution and precipitate separation 17 to copper electrowinning 12. The removal of rhodium also is carried out by means of sulfur dioxide precipitation, but this takes place with a higher acid content than the precipitation of selenium, and therefore anolyte (return acid) is fed to this stage from copper electrowinning. The rhodium precipitate is recovered, and the purified solution is conducted to copper electrowinning.

The invention is further described with reference to the examples below. The examples show that in both pressure leaching stages (3 and 4), it is advantageous to add as little acid as possible.

EXAMPLE 1

Nickel copper matte, with a composition of 41.4% Ni, 31.2% Cu and 22% S, was processed according to the method of the present invention. The circumstances and results are given in Table 1. It is apparent from the results that in stage 3, nickel is leached extremely well, although the acid content in the feed solution was only 5 g/l.

The main component in the end precipitate coming from the pressure leaching stage 4 is antlerite $CuSO_4 \cdot Cu(OH)_2$, which is easily dissolved into acid. The end precipitate was leached at pH 2, and after the leaching, the amount of undissolved precipitate was 1.9 g. The composition of the remaining precipitate was: Cu 3.1%, Fe 15.6%, Ni 0.4%, Pb 5.1%, S 6.1%, Pt 10.4%, Pd 7.7%, Au 3.1%, and Ag 4.7%. The result shows that everything that could be oxidized in these conditions also reacted, and as a result, there was obtained a high-class precious metal concentrate.

TABLE 1

| | Solution g/l | | | | Solids % | | |
|---|---|---|---|---|---|---|---|
| V/L | Ni | Cu | $H_2SO_4$ | m/g | Ni | Cu | S |
| Atmospheric leaching 1 | | | | | | | |
| 4 h, 80° C., $O_2$ feed | | | | | | | |
| In 8.9 | 96 | 8.6 | pH 2.3 | 500 | 41.4 | 31.2 | 22 |
| Out 8.3 | 107 | 0.004 | pH 6.3 | 630 | 22.8 | 37 | 19.3 |
| Atmospheric leaching 2 | | | | | | | |
| 4 h | | | | | | | |
| In 7.4 | 46 | 3.6 | 24 | 630 | 22.8 | 37 | 19.3 |
| Out 7.2 | 56 | 14.5 | pH 3.9 | 430 | 19.8 | 36.4 | 28.1 |
| Pressure leaching 3 | | | | | | | |
| 140° C., $O_2$ atmosphere | | | | | | | |
| In 2.95 | 34 | 54 | ~5 | 430 | 19.8 | 36.4 | 28.1 |
| Out 2.88 | 58 | 11.6 | 27 | 400 | <0.1 | 71 | 23.6 |
| Pressure leaching 4 | | | | | | | |
| 4 h, 115° C., $O_2$ 7 bar | | | | | | | |
| In 3 | 0.38 | 29 | 36 | 400 | <0.1 | 71 | 23.6 |
| Out 2.9 | 0.49 | 102 | pH 3 | 49 | <0.05 | 50 | 8.8 |

EXAMPLE 2

Stages 1 and 2 were run according to Example 1, and only stages 3 and 4 are illustrated in table 2. From the results it is seen that a high initial acid is not preferable in stage 3, because in the precipitate nickel remains higher than in Example 1. The high acid content is a drawback also in stage 4. In the leaching there is created elemental sulfur, which also partly prevented a complete leaching of copper sulfide.

TABLE 2

| | Solution g/l | | | | Solids % | | |
|---|---|---|---|---|---|---|---|
| V/l | Ni | Cu | $H_2SO_4$ | m/g | Ni | Cu | S |
| Pressure leaching 3 | | | | | | | |
| In 2.9 | 48 | 43 | 15 | 425 | 23.8 | 33 | 27 |
| Out 2.9 | 76 | 1.2 | 37 | 385 | 0.47 | 70 | 24.1 |
| Pressure leaching 4 | | | | | | | |
| In 3 | | 28 | 47 | 385 | 0.47 | 70 | 24.1 |
| Out 3 | | 106 | 22 | 6 | 0.28 | 27.8 | 45.2 |

We claim:

1. A method for recovering metals by leaching from finely ground nickel-copper matte containing primary nickel and copper sulfides, said method comprising:

(a) leaching the nickel-copper matte at atmospheric pressure in the presence of oxygen using a substantially neutral leaching solution containing copper sulfate, wherein said substantially neutral leaching solution is essentially lacking in free sulfuric acid, whereby step (a) produces a nickel sulfate solution and a precipitate of primary nickel and copper sulfides, (b) nickel electrowinning the nickel sulfate solution from step (a) and producing an anolyte that contains free sulfuric acid, (c) leaching the precipitate from step (a) at atmospheric pressure in the presence of oxygen using the anolyte from step (b) as leaching solution, whereby step (c) produces a solution of nickel and copper sulfates and a precipitate of secondary nickel and copper sulfides, and (d) pressure leaching the precipitate from step (c) using substantially neutral copper sulfate as leaching solution, whereby step (d) produces a solution of nickel sulfate and a copper-rich precipitate.

2. A method according to claim 1, wherein the leaching solution used in step (a) also contains nickel sulfate.

3. A method according to claim 1, comprising neutralizing free sulfuric acid in the anolyte from step (b) and producing a substantially neutral nickel sulfate solution, and including the substantially neutral nickel sulfate solution in the leaching solution used in step (a).

4. A method according to claim 1, further comprising using the precipitate from step (d) to form copper sulfate solution and supplying copper sulfate solution thus formed to step (d).

5. A method according to claim 1, further comprising:

(e) pressure leaching the precipitate from step (d) in the presence of oxygen using an acidic leaching solution, whereby step (e) produces a solution that contains copper sulfate.

6. A method according to claim 1, wherein the matte contains selenium and the method further comprises:

(e) pressure leaching the precipitate from step (d) in the presence of oxygen using an acidic leaching solution, whereby step (e) produces a solution containing copper sulfate and selenium, and (f) supplying sulfur dioxide to the solution produced by step (e), whereby step (f) produces a solution containing copper sulfate and a precipitate containing copper selenide.

7. A method according to claim 6, wherein the matte contains rhodium and the method further comprises:

(g) acidifying the solution produced by step (f) and supplying sulfur dioxide to the acidified solution, whereby step (g) produces a solution containing copper sulfate and a precipitate containing rhodium selenide.

8. A method according to claim 7, further comprising:

(h) copper electrowinning the solution produced in step (g) and producing an anolyte containing sulfuric acid, and (i) employing the anolyte from step (h) for acidifying the solution produced by step (f).

9. A method according to claim 8, comprising providing the anolyte from step (h) to step (e).

10. A method according to claim 6, comprising providing the solution produced by step (f) to step (d).

11. A method according to claim 1, wherein the matte contains cobalt and precious metals and the method further comprises:

(e) pressure leaching the precipitate from step (d) in the presence of oxygen using an acidic leaching solution, whereby step (e) produces a solution containing ions of copper, nickel and cobalt and a precipitate containing precious metals.

12. A method according to claim 11, wherein the pH of the acidic leaching solution in step (e) is in the range from about 2.7 to about 3.2.

13. A method according to claim 12, wherein the pH of the acidic leaching solution in step (e) is about 3.

14. A method according to claim 1, further comprising:

(e) pressure leaching the precipitate from step (d) in the presence of oxygen using an acidic leaching solution, whereby step (e) produces a solution that contains copper sulfate, (f) purifying the copper sulfate solution produced by step (e), and (g) copper electrowinning at least part of the purified copper sulfate solution from step (f).

15. A method for recovering metals by leaching from finely ground nickel-copper matte containing primary nickel and copper sulfides, said method comprising:

(a) leaching the nickel-copper matte at atmospheric pressure in oxidizing conditions at a temperature in the range from about 80°–100° C. using a substantially neutral leaching solution containing nickel sulfate and copper sulfate, whereby step (a) produces a nickel sulfate solution and a precipitate containing primary nickel and copper sulfides, (b) purifying the nickel sulfate solution from step (a), (c) nickel electrowinning the purified nickel sulfate solution from step (b) and producing an anolyte that contains sulfuric acid and nickel sulfate, (d) selecting a first portion of the anolyte from step (c) and neutralizing free acid present in said first portion, and supplying the neutralized first portion to step (a) for use as at least a portion of the leaching solution, (e) selecting a second portion of the anolyte from step (c), (f) leaching the precipitate from step (a) at atmospheric pressure in oxidizing conditions at a temperature in the range from about 80°–100° C. using the second portion of the anolyte from step (c) as leaching solution, whereby step (f) produces a solution of nickel and copper sulfates and a precipitate of secondary nickel and copper sulfides, (g) supplying the solution produced in step (f) to step (a) for use as at least a portion of the leaching solution, (h) pressure leaching the precipitate from step (f) in non-oxidizing or mildly oxidizing conditions at a temperature of at least 110° C. using substantially neutral copper sulfate as leaching solution, whereby step (h) produces a solution of nickel sulfate and a copper-rich precipitate, step (h) being continued for sufficiently long to ensure that any selenium or precious metals present in the leaching solution are precipitated, (i) supplying the solution produced by step (h) to step (f) as leaching solution, (j) pressure leaching the precipitate from step (h) in oxidizing conditions at a temperature in the range from about 80°–150° C. using an acidic leaching solution, whereby step (j) produces a solution that contains copper sulfate, (k) precipitating selenium from the solution from step (j), whereby step (k) produces a solution containing copper sulfate, (l) supplying a first part of the solution from step (k) to step (h) as leaching solution and precipitating rhodium from a second part of the solution from step (k), whereby step (l) produces a solution containing copper sulfate, (m) copper electrowinning the solution from step (l) and producing an anolyte containing sulfuric acid, and (n) employing the anolyte from step (m) as the leaching solution employed in step (j).

16. A method according to claim 15, wherein the solution produced in step (h) contains iron and arsenic, and the method further comprises precipitating iron and arsenic from the solution supplied to step (f) in step (i).

17. A method according to claim 15, wherein the matte contains precious metals and step (j) produces a precipitate that contains precious metals, and the method comprises recovering the precious metals from the precipitate from step (j).

* * * * *